April 18, 1950   A. J. KEYZER   2,504,426
METHOD FOR FORMING FLAT SPIRAL GLASS TUBING
Filed July 24, 1946   4 Sheets-Sheet 1
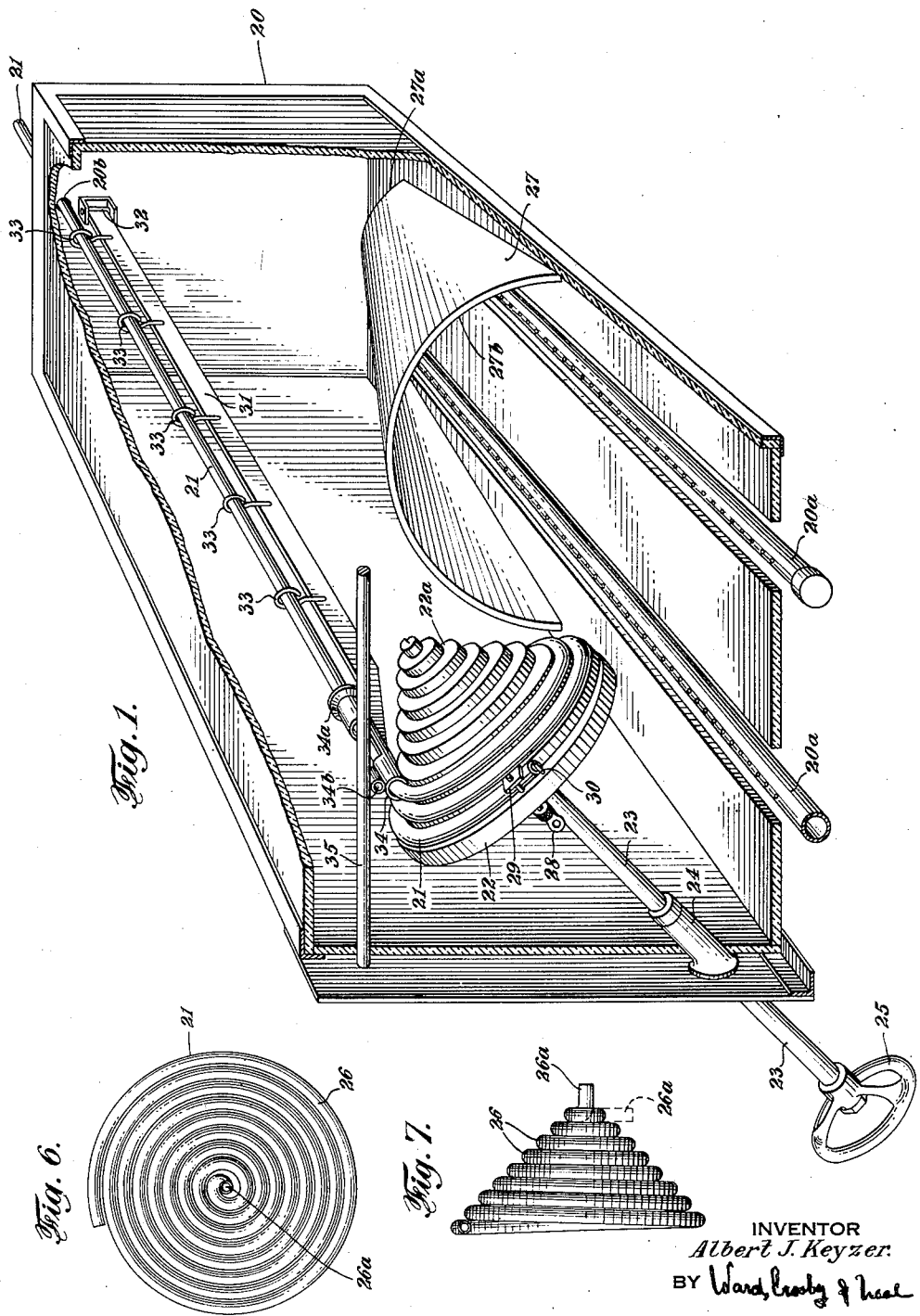
INVENTOR
*Albert J. Keyzer.*
BY *Ward, Crosby & Neal*
ATTORNEYS

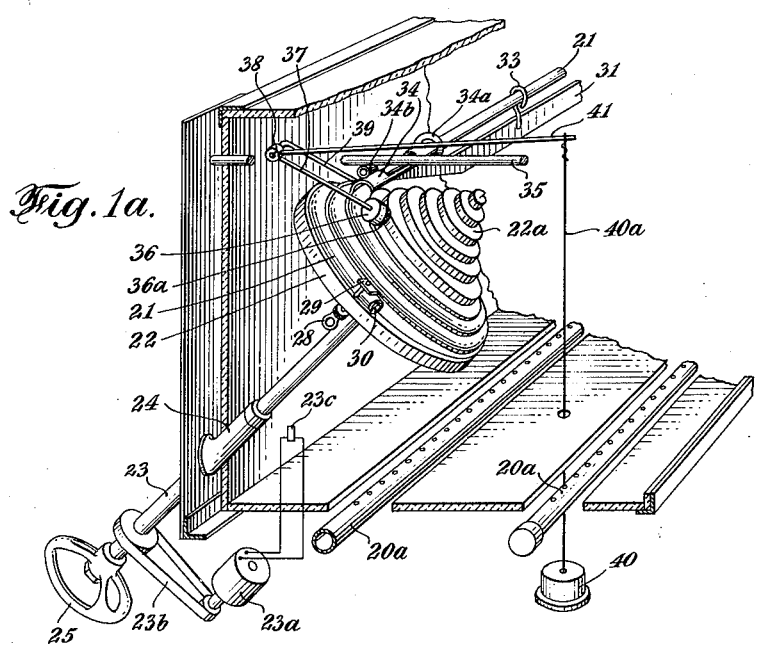

April 18, 1950 A. J. KEYZER 2,504,426
METHOD FOR FORMING FLAT SPIRAL GLASS TUBING
Filed July 24, 1946 4 Sheets-Sheet 3
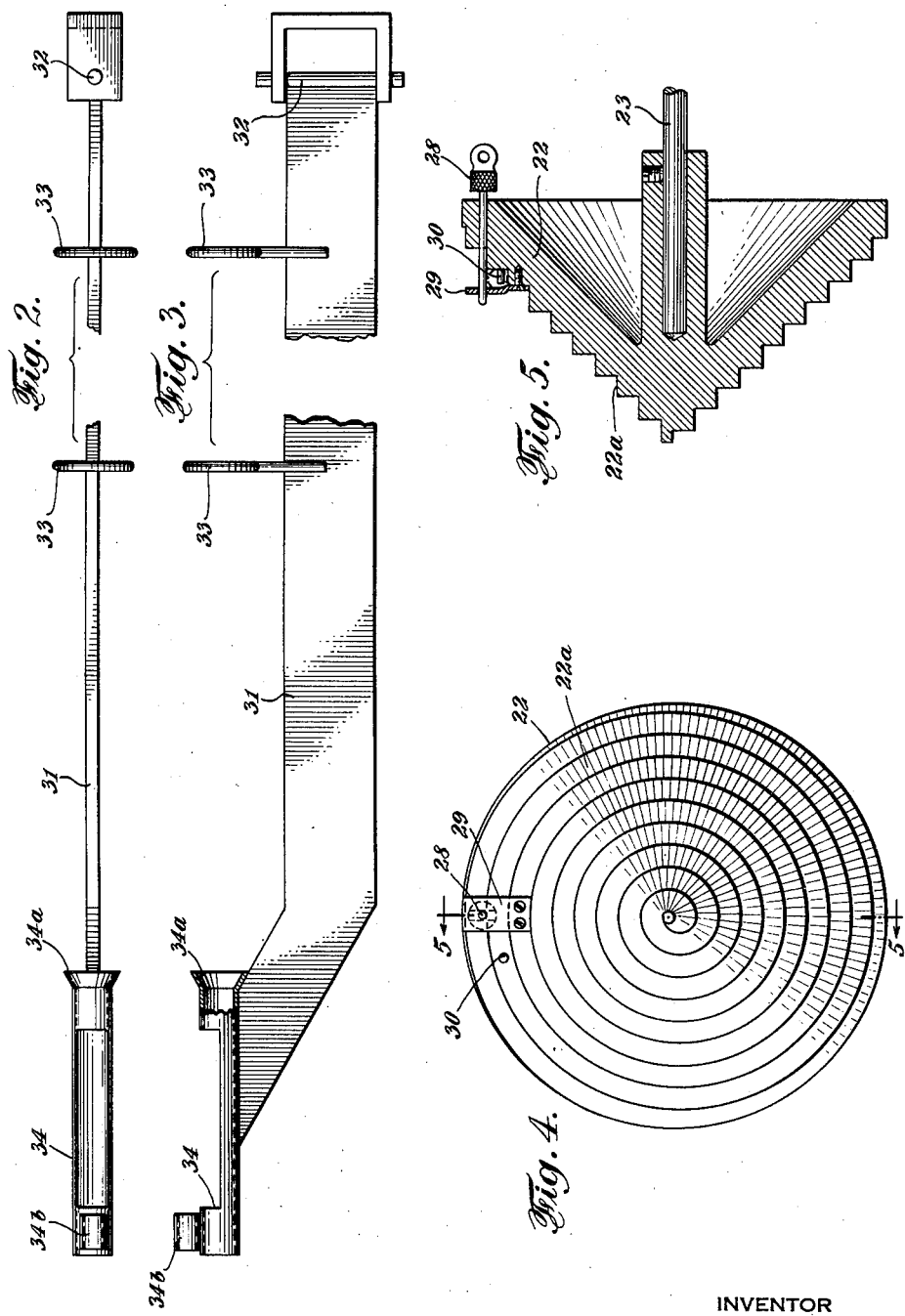
INVENTOR
Albert J. Keyzer.
BY Ward, Crosby & Leal
ATTORNEYS April 18, 1950 A. J. KEYZER 2,504,426
METHOD FOR FORMING FLAT SPIRAL GLASS TUBING
Filed July 24, 1946 4 Sheets-Sheet 4
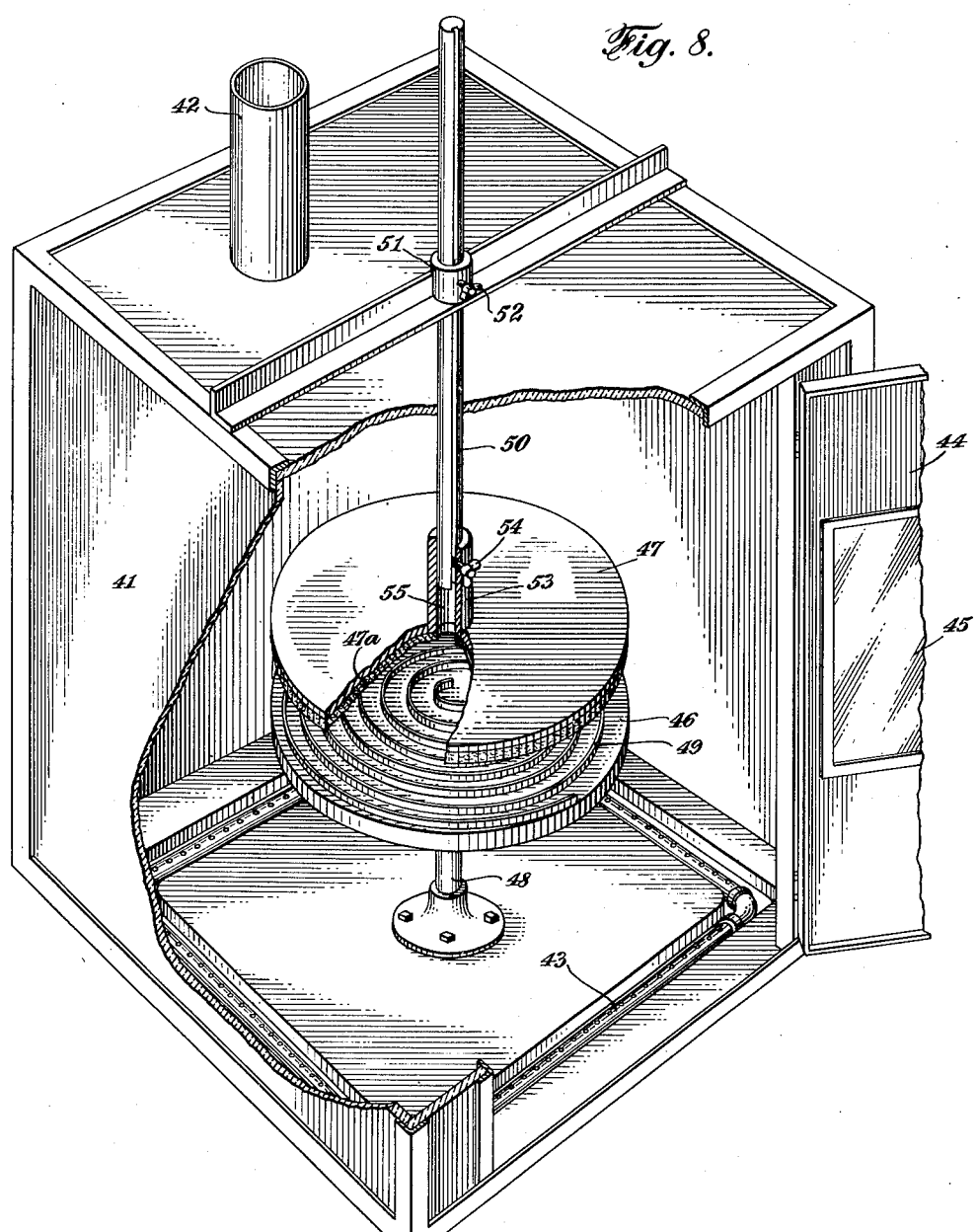
Fig. 8.
Fig. 9.
INVENTOR
Albert J. Keyzer.
BY Ward, Crosby & Neal
ATTORNEYS Patented Apr. 18, 1950

2,504,426

UNITED STATES PATENT OFFICE 2,504,426

METHOD FOR FORMING FLAT SPIRAL GLASS TUBING

Albert J. Keyzer, Norwalk, Conn.

Application July 24, 1946, Serial No. 685,799

1 Claim. (Cl. 49—84)

This invention relates to methods for forming glass tubing into flat spirals for use as gaseous discharge lamps and the like.

In practices and procedures heretofore employed in forming spirals of glass tubing it is common practice to bring to a bendable heat, a few inches of tubing and to form a small central turn, after which the spiral is gradually formed by succeeding applications of heat and successive bending of the tubing a few inches at a time. Sufficient time must be allowed after each heating and bending to permit the tubing to cool before being brought to a bendable heat again. This method is slow, laborious and requires the ability of a skilled artisan. Hence it is an expensive process.

The above method tends to draw out the glass tubing whereby the diameter thereof is somewhat reduced. This makes it difficult to adhere to certain prescribed standards of spacing between adjoining sections or convolutions of the spiral which may result in an electronic breakthrough or a discharge from one convolution to the next during the bombardment stage of the manufacture of the vapor lamp wherein an extremely high voltage is directed into the tube to assist in forming a vacuum therein by burning out undesirable substances. If such a breakthrough or electronic discharge occurs during this stage of the manufacture of the lamp, it will most likely result in the burning of a hole in one or more convolutions of the tubing and the consequent destruction of the value of the tube.

In forming spiral tubing of this character, for example, for the manufacture of spiral fluorescent lamps and the like, it is necessary that accurate spacing of the convolutions of the spiral exist in order to achieve a uniformity of light emission progressively across the spiral face thereof. The methods and apparatus heretofore proposed for this purpose have been unable to accomplish this accurate spacing and thus have not achieved a uniform light emission.

According to the present invention, a method for forming a flat spiral of glass tubing is provided to eliminate the above noted difficulties or minimize same to such an extent that they become insignificant.

Various further and more specific objects, features and advantages of the invention will clearly appear from the detailed description given below taken in connection with the accompanying drawings which form a part of this specification and illustrate, by way of example, preferred arrangements of apparatus for carrying out the invention. The invention consists in such novel combinations and features, means and method steps as may be shown and described in connection with the equipment herein disclosed.

In the drawings:

Figure 1 is an isometric view partly in section and with parts broken away of one embodiment of the invention for forming a spiral conical tube;

Fig. 1a is an isometric view of a tube flattening roller device which may be employed with the apparatus of Fig. 1;

Fig. 1b is a plan view of the tube flattener shown in Fig. 1a;

Fig. 1c is a side elevation of the tube flattener roller shown in Fig. 1a;

Fig. 2 is a plan view with parts broken away of a means for guiding glass tubing to a conical spindle;

Fig. 3 is a side elevation of the parts shown in Fig. 2;

Fig. 4 is a plan view of a grooved conical spindle upon which the glass tubing may be wound;

Fig. 5 is a cross-section taken along line 5—5 of Fig. 4;

Fig. 6 is a plan view of a conical spiral tubing which has been formed upon the conical spindle shown in Fig. 4;

Fig. 7 is a side elevation of the conical spiral tubing shown in Fig. 6;

Fig. 8 is an isometric view partly in section and with parts broken away of an apparatus for flattening a conical spiral tube;

Fig. 9 is a cross-sectional area of a conical spiral which has been flattened; and Figs. 10 and 11 show cross-sectional areas of a plurality of tubes illustrating schematically and comparatively the projected areas of illumination of unflattened and flattened tubes respectively.

Referring to the drawings in further detail, the novel apparatus broadly embodies an oven with suitable heat controls for heating glass tubing to a bendable temperature, and means for winding glass tubing so heated upon a conical guide member or spindle having a conical spiral groove cut therein whereby the tubing is laid in the spiral groove. Means are provided for collapsing the conical spiral tube which has been wound upon said spindle, whereby in the presence of necessary heat, the conical spiral is reduced to a flat spiral.

In the form shown in Fig. 1, the novel conical spiral tube-forming apparatus is constituted by an oven 20 having therein suitable burners 20a, which may be adapted for burning any suitable combustible substance such as coal gas, and which are adapted for bringing the temperature within the oven 20 up to a predetermined point which preferably is just sufficient to permit a glass tube 21 to be bent. This temperature is referred to as the bendable temperature of the glass and permits the glass tubing to be bent with a minimum of cross-sectional distortion. A glass feed aperture 20b may be provided through which glass tubing may be inserted and guided in a manner to appear hereinafter.

A conical spindle 22 is rotatably mounted in said oven upon a shaft 23 which is supported in a journal 24 and which extends exteriorly of the oven 20 where it is provided with a hand wheel 25 for turning the spindle.

The conical spindle or guide member 22 is provided with a spiral conical groove 22a in the surface thereof which is of such dimensions that the straight glass tube 21 which is laid therein is formed into spiral convolutions which have a predetermined spacing therebetween. The bottom surface of groove 22a is preferably flat in the sense that it is a surface of revolution formed by a progressively changing radius of the cone. The spiral convolutions form from tube 21 a conical spiral tube 26. Said predetermined spacing is necessary in order that the finished product, that is, a flat spiral tube, may have the convolutions thereof at proper intervals which will prevent the above mentioned electronic breakthrough from one convolution to the next during the so-called bombardment stage of the manufacture of a spiral mercury vapor lamp.

Suitable means (not shown) may be provided for controlling the intensity of the combustion within the oven 20 whereby a uniform bendable temperature may be maintained. There also preferably is provided within the oven 20 a suitable baffle plate 27 which, for example, may be in the form of a half section of a hollow truncated cone, which is adapted for directing heat toward the spindle or cone 22 and for producing a flue or chimney action whereby the hot gases are circulated from the extremity 27a thereof to 27b, and thereafter directed toward the conical spindle. Suitable air vents (not shown) may be provided in the oven preferably above the conical spindle 22. Air may be drawn into the oven through slots adjacent the burners.

The conical guide member or spindle 22 preferably is positioned in such a manner that the uppermost side thereof is horizontal. The conical spindle, for example, may be a 45-degree cone, that is, the sides thereof are at a 45-degree angle to the longitudinal axis thereof. If the uppermost side of the cone is horizontal, then the shaft 23 will be disposed at a 45-degree angle to the horizontal, and a 45-degree angle to a vertical side of the oven 20.

Means are provided for holding an extremity of a glass tube on the conical spindle comprising, for example, a detachable locking pin 28 which may extend through a bore within the member 22, and which bore is preferably parallel to the axis of the cone. Pin 28 is adapted for cooperating with a locking shoulder 29 in holding said tube in position for bending or winding. A tube limit stop comprising a pin 30 may be mounted on spindle 22 in spaced relation to the locking shoulder and locking pin.

Novel means are provided for guiding the glass tubing 21 to the conical spindle 22 comprising a pivotally mounted supporting arm 31 which is mounted upon a vertical pivot at 32 which is preferably adjacent the feed aperture 20b. In order that the glass may be led to the conical spindle in such a manner that it may be fully exposed to the effects of the heat in the oven, it is desirable that supporting members be employed which do not shield the tubing from the heat. Consequently, such non-shielding tube supporting members are provided consisting of a plurality of spaced eye members 33 which are mounted at suitable intervals upon the support arm 31 and which are adapted for receiving the tube 21 loosely and for guiding same to a tube guiding thimble or tube guide 34. The latter, in the form shown, is constituted by a short tubular support having a portion centrally cut away therefrom in order to avoid shielding an appreciable length of glass from the heat. The thimble has an inner diameter which is sufficiently large to allow free movement of the glass tube therein. In order to facilitate the entry of glass to the thimble, one extremity thereof as at 34a may be flared outwardly.

In order for the tube to receive the full effect of the heat in the oven it is desirable for the spindle 22 to be at one extremity of the oven opposite to that of feed orifice 20b. Consequently, an appreciable length of tubing is exposed to the oven heat at all times and a given portion of glass must traverse almost the entire length of the oven before it reaches the spindle 22.

The tube guide or thimble 34 is adapted for engaging the groove which is formed in the cone 22 and for advancing axially of the cone and along the side thereof when the cone is rotated. The grooved cone thus constitutes a worm gear when rotated which moves the thimble 34 angularly about the pivot 32 and axially relative to the cone as it progresses along the side of the cone.

Means preferably are provided for holding the thimble 34 in engagement with the groove 22a comprising a cross-guide 35. Thus as the thimble 34 advances along the surface of the cone in response to rotation therof, it is held within the groove by said cross-guide.

In order to prevent a conflict between the locking shoulder 29 and the cross-guide 35, a cross-guide spacing member 34b may be provided which is mounted upon the thimble 34 and which maintains the cross-guide at all times in sufficient spaced relationship with the cone 22. A slight clearance, for example, of about .010" may exist between the spacing member 34b and the cross-guide 35.

Means may be provided as shown in Fig. 1a for flattening the glass tube as it is being fed upon the conical spindle in order to obtain a greater projected area of uniform illumination, that is, in order to obtain the maximum projected area of maximum illumination from the spiral tube per unit length of tube.

A representation of unflattened and flattened tubing is shown in Figs. 10 and 11 respectively. In Fig. 10, there is illustrated a cross-sectional area of three adjacent convolutions of a flat spiral tube which tube has not been squeezed or flattened. In Fig. 11, there is shown a cross-sectional area of three adjacent convolutions of a flat spiral tube which has been squeezed or flattened somewhat. The normal spacing and projected areas of illumination are illustrated in both Figs. 10 and 11. In Fig. 10, wherein the tubing has not been flattened, the centers of the tubes are the same distance apart as those of the flattened tubes shown in Fig. 11. It has been experienced that less tubing is necessary to form a spiral of a given diameter when the tubing is flattened, and that more even or uniform illumination is obtained by the flattened tubing. It can be seen from these two figures that the non-flattened tubing would have to be brought much closer together to achieve the illumination of the flattened tubing. In bringing the non-flattened tubing closer together, the required number of turns and the length of glass must necessarily be increased.

The tube flattening means may be attached to thimble 34 (Figs. 1a, 1b) and comprises preferably means for exerting a pressure on the tube near the thimble outlet. The pressure preferably is in a direction parallel to the cone axis. Said means may comprise a weighted roller 36 mounted upon an arm 37 which is pivoted at 38 upon a support arm 39. The latter may be rigidly attached to thimble 34. Roller 36 may be provided with a smaller concentric integral roller 36a (Fig. 1c) which is preferably knurled and is adapted for engaging an adjacent step or convolution of groove 22a when the roller has pressed the tube by a predetermined amount, thus limiting the pressing action. Roller 36a is used to insure a uniformity of flattening. The pressure exerted by the roller may be effected by a weight 40 which preferably is suspended below and outside the oven by means of a cable 40a attached to an arm 41 which in turn is attached to arm 37. The roller thus squeezes the tube against the lower face of groove 22a.

By means of the tube flattener it is possible to flatten the tube, for example, from 10% to 30% to a cross-sectional shape as shown in Fig. 11. A 10 mm. tube may be flattened substantially to the shape of a flattened ellipse wherein the minor axis is from 7 mm. to 9 mm.

Novel means are provided for collapsing a conical spiral formed on the spindle comprising (Fig. 8) apparatus for exerting a flattening or collapsing pressure and for simultaneously applying heat to the conical spiral tube.

The collapsing means comprises, in the form shown in Fig. 8, an oven 41 of conventional design, having a chimney 42, a suitable burner 43 and a door 44. The latter may be provided with a viewing window 45. Temperature control means (not shown) may be employed for maintaining the oven at a glass bendable temperature.

Within the oven are two opposed collapsing plates which are adapted for relative movement preferably in such a manner that they are at all times parallel, and preferably at all times perpendicular to a common central axis. Such movement is herein designated as relative axial movement of the collapsing plates.

Said plates are constituted by a base or primary collapsing plate 46 and a cover or secondary plate 47. The latter may have an asbestos facing 47a attached to the lower surface thereof to protect it from the heat of the glass. The base plate is preferably stationary and may be mounted upon a pedestal 48 at an advantageous thermal position in the oven. Plate 46 is provided with a spiral guide 49 into which the spiral conical tube is collapsed when the proper temperature is attained. Spiral guide 49 may be constituted by a groove cut in the base plate 46 or preferably it may be formed by mounting a spiral strip of metal upon said base plate. It is desirable that the spiral guide be employed in order to assure proper spacing of the convolutions of the lamp and thus in order to: (1) avoid an electronic breakthrough between the coils as above discussd; and (2) in order to assure substantial uniformity of light intensity across the face of the flattened spiral lamp.

It is desirable for the spiral groove 22a to be cut or formed in the conical spindle 22 in such a manner that the spiral conical tube 26 (Fig. 7) formed thereon will easily fit into the spiral guide of the base plate. In other words the inter-coil spacing of the spiral conical tube before collapsing should provide a projection substantially similar to the spiral guide 49.

In order to avoid a twisting or angular distortion of the spiral cone as it is collapsed, it is desirable to prevent any relative angular movement of the two collapsing plates. Means are provided for mounting the cover plate 47 for said axial movement relative to the base plate 46 whereby said angular movement is prevented, comprising, for example, an axially shiftable shaft 50 which is keyed for axial movement only within a bushing 51 and which may be locked in any desired axial position by a suitable lock nut 52 in said bushing. The cover plate 47 is associated with shaft 50 by means of a centrally disposed sleeve 53 mounted on the cover plate. A lock nut 54 may be provided in sleeve 53 for adjustably locking the shaft 50 therein.

In order to provide a space for a central extremity 26a (Fig. 7) of the spiral tube during the formation of the flat spiral, the shaft 50 may be positioned so as to occupy only a part of the bore of the sleeve 53. A space or chamber 55 may thus be reserved into which the central extremity of the tube may extend. This tube extremity may be about two inches in length and is normally employed for the attachment of one of the electrodes.

In operation, the conical spindle is prepared for receiving a glas tube by rotating it in an unwinding or reverse direction (clockwise looking down on spindle) whereby the guide or thimble 34 is moved toward the base of the cone by the worm wheel action of the groove 22a. Rotation in this direction should continue until the lock shoulder 29 abuts against the thimble 34. Glass tubing is then inserted through feed orifice 20b and is guided by the eyes 33 to the thimble 34. After passing through the thimble the tube progresses into the groove 22a under the locking pin 28 and abuts against the tube limit stop 30.

Heat may be applied to the tube during the above operation.

As soon as the glass tube is in place, as above described, the conical spindle is angularly shifted through a few degrees by means of hand wheel 25 in a tube winding direction (counterclockwise looking down on spindle), which causes locking pin 28 to engage the tube and to exert pressure thereupon in response to the angular shifting of the pin with the movement of the spindle. This pressure will be in the direction of angular movement of said spindle and will urge the tube to pivot about the point of tangency of the tube with the spindle. This consequently will urge that portion of the tubing which is in the thimble upwardly and somewhat to the left, as viewed in Fig. 1, thus urging the thimble upwardly. The thimble is prevented from moving upwardly by the cross guide 35 and spacer 34b.

Consequently, a tube bending moment is created at the outlet of the thimble.

The hand wheel is yieldingly urged in a tube winding direction whereby sufficient pressure is maintained to bend the glass when it reaches a bendable temperature. Such pressure, however, should not be sufficient to break the glass.

Baffle 27 focuses heat upon the cone. As soon as a bendable glass temperature is reached the winding operation begins and the glass tube is drawn from the thimble and laid into the spiral groove 22a as the conical spindle is rotated. Cool glass is thus drawn into the oven through the feed aperture 20b and reaches a bending temperature by the time it has progressed to the thimble 34.

In the event that the tube flattening roller (Fig. 1a) is employed, the glass tubing is flattened by a predeterminable amount as it is laid into the groove 22a.

The length of the glass tube preferably is such that when the winding operation reaches the last convolution of the spiral the extremity of the tube is pulled out of the thimble 34. The latter thus having progressed to the peak of the cone, may now be moved entirely out of engagement with the cone. The thimble 34 may thus be angularly shifted about pivot 32 and moved clear of the cone in order to enable removal of the spiral tube.

At this point the heat is preferably removed from the oven by turning off the burners and opening a door to the oven 20.

When the spiral conical glass tube has cooled sufficiently, i. e., when the glas is firm, the lock pin 28 is removed and said tube is unscrewed from the spindle and removed from the oven.

The thimble can now reengage the peak of the cone and be shifted to its initial position by reverse rotation of the cone.

As shown in dotted lines in Fig. 7 a central extremity 26a at the peak of the cone 26 is formed substantially parallel to the convolutions of the spiral. Extremity 26a may now be heated and bent by hand means into a position coaxial with the cone as shown in solid lines (Fig. 7).

The spiral conical tube is next placed in the oven 41 upon the base plate 46 and the base thereof is fitted over the spiral guide 49. The extremity 26a then is inserted into the chamber 55 as the cover plate 47 is lowered.

Heat is applied to the glass spiral in the oven 41 by the burner 43. When a bendable glass temperature has been reached the cover plate is yieldingly thrust downwardly thus collapsing the conical spiral into a flat spiral conforming to the spiral guide 49. During this operation the individual tubes are not squeezed or flattened to produce flattened tubes as shown in Fig. 11. However, it is possible to exert sufficient pressure upon the spiral when it has been collapsed in order partially to flatten the tubes as shown in said figure. However, it is preferable to accomplish this type of tube flattening by means of the pressure roller as shown in Fig. 1a.

While the invention has been described with respect to certain preferred examples which have given satisfactory results, it will be understood by those skilled in the art after understanding the invention that various changes and modifications may be made without departing from the spirit and scope of the invention, and it is intended therefore in the appended claim to cover all such changes and modifications. For example, instead of a hand wheel suitable power means such as an electric motor 23a (Fig. 1a) may be used to drive shaft 23 through any suitable connection such as a friction drive or belt 23b. The torque exerted by the motor may be a function of the oven or glass temperature and may be controlled by a thermostat 23c in the oven. By adjustment of the friction drive and the thermostat the torque may be controlled so that at no time will it be sufficient to break the glass.

What is claimed as new and desired to be secured by Letters Patent is:

Method for forming a closely wound spiral glass tube, the spiral being flat, comprising: applying heat to a glass tube along a substantial portion of the length thereof to heat same to a bendable temperature; winding the heated glass tube around a conical guide having a spiral conical groove formed therein with a substantially flat bottom surface; applying mechanical pressure to said glass tube as it is wound upon said guide partially to flatten the tube against said bottom surface by a preselected amount; removing the heat from the tube; disengaging the spirally wound conical tube from the conical guide; applying sufficient heat to the tube to permit collapsing of same to a flat spiral; and applying a collapsible pressure to the tube to form same into a flat spiral.

ALBERT J. KEYZER.

REFERENCES CITED

The following references are of record in the file of this patent:

UNITED STATES PATENTS

| Number | Name | Date |
|---|---|---|
| 233,463 | Bakewell | Oct. 19, 1880 |
| 490,845 | Foster et al. | Jan. 31, 1893 |
| 1,482,455 | Berry | Feb. 5, 1924 |
| 2,080,899 | Pirani et al. | May 18, 1937 |
| 2,239,055 | Sawyer | Apr. 22, 1941 |
| 2,296,321 | Wellech | Sept. 22, 1942 |
| 2,342,609 | Ellefson | Feb. 22, 1944 |
| 2,366,141 | Alderfer | Dec. 26, 1944 |

FOREIGN PATENTS

| Number | Country | Date |
|---|---|---|
| 378 | Great Britain | Nov. 17, 1900 |